US009081703B2

(12) United States Patent
Nair et al.

(10) Patent No.: US 9,081,703 B2
(45) Date of Patent: Jul. 14, 2015

(54) METHOD AND APPARATUSES FOR FACILITATING SHARING DEVICE CONNECTIONS BETWEEN A HOST AND CLIENT BASED ON THE POWER MODE OF THE HOST

(75) Inventors: Sreekumar Ramakrishnan Nair, San Jose, CA (US); Weidong Shi, Pearland, TX (US); Timothy Youngjin Sohn, Mountain View, CA (US); Adhyas Avasthi, Fremont, CA (US); Cynthia Kuo, Mountain View, CA (US); Rachel Beth Hinman, Mountain View, CA (US); Quinn Able Jacobson, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 516 days.

(21) Appl. No.: 13/233,537

(22) Filed: Sep. 15, 2011

(65) Prior Publication Data

US 2013/0072260 A1    Mar. 21, 2013

(51) Int. Cl.
| | | |
|---|---|---|
| G06F 1/00 | (2006.01) | |
| H04B 1/38 | (2006.01) | |
| G06F 15/173 | (2006.01) | |
| G06F 13/10 | (2006.01) | |

(52) U.S. Cl.
CPC .......... *G06F 13/102* (2013.10); *Y02B 60/1228* (2013.01)

(58) Field of Classification Search
CPC ............................. G06F 15/173; G06F 1/3203
USPC ............................. 713/300; 455/566; 709/223
See application file for complete search history.

(56) References Cited

U.S. PATENT DOCUMENTS

| | | | |
|---|---|---|---|
| 7,478,180 B1 * | 1/2009 | Li ................................... 710/62 |
| 2005/0091365 A1 * | 4/2005 | Lowell et al. ................. 709/224 |
| 2008/0307213 A1 * | 12/2008 | Sekiguchi et al. ................ 713/1 |
| 2009/0086660 A1 * | 4/2009 | Sood et al. ..................... 370/311 |
| 2009/0119684 A1 * | 5/2009 | Mahalingam et al. ........ 719/324 |
| 2009/0144570 A1 * | 6/2009 | Chen et al. .................... 713/320 |
| 2009/0204965 A1 * | 8/2009 | Tanaka et al. ..................... 718/1 |
| 2010/0049960 A1 * | 2/2010 | Okamoto et al. ................. 713/1 |

OTHER PUBLICATIONS

USB Architecture in Windows Virtual PC, Rahul Rajwanshi, hereinafter "Rajwanshi", available at http://blogs.technet.com/b/windows_vpc/archive/2009/12/14/usb-architecture-in-windows-virtual-pc.aspx, TechNet Archive, Dec. 13, 2009, viewed on Jun. 25, 2013.*

* cited by examiner

*Primary Examiner* — Thomas Lee
*Assistant Examiner* — Robert Cassity
(74) *Attorney, Agent, or Firm* — Alston & Bird LLP

(57) ABSTRACT

Methods and apparatuses are provided for facilitating sharing device connections across multiple physical and/or virtual (logical) computers. A method may include receiving a USB device request from a virtual host controller driver of a client when a host is not in a power save mode and passing a USB device request to a host controller driver of the client when the host is in a power save mode. A method may also include activating a sharing switch of a host controller to connect a device connection port to the host when the host is not in a power save mode and to connect the device connection port to the client when the host is in a power save mode. Corresponding apparatuses and computer program products are also provided.

19 Claims, 10 Drawing Sheets

Scenario 1. Linux→Windows USB/IP

Scenario 2. Windows→Linux USB/IP

Scenario 3. Windows→ Linux USB/IP (Switched)

METHOD AND APPARATUSES FOR FACILITATING SHARING DEVICE CONNECTIONS BETWEEN A HOST AND CLIENT BASED ON THE POWER MODE OF THE HOST

TECHNOLOGICAL FIELD

Example embodiments of the present invention relate generally to device connectivity and, more particularly, relate to methods and apparatuses for facilitating sharing device connections, such as sharing a Universal Serial Bus (USB) device connection between multiple domains of a dual operating system computer.

BACKGROUND

The modern computing and communications era has brought about tremendous changes in computing power and devices. This expansion in computing power has led to computing devices more frequently being used to run more than one operating system, such as where an internal disk drive is partitioned into at least two partitions, one to run each of Windows and Linux, thereby sharing hardware of a single computing device for multiple operating systems. And this expansion in computing power has also led to a reduction in the size of computing devices and given rise to a new generation of portable and mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds. As a result of the reduction in size of computing devices, the number of available external device connection ports is physically limited.

BRIEF SUMMARY

Systems, methods, apparatuses, and computer program products are herein provided for facilitating sharing device connections. Systems, methods, apparatuses, and computer program products in accordance with various example embodiments may provide several advantages to computing devices and computing device users. Device connections may be shared across multiple physical and/or virtual (logical) computers. In this regard, some example embodiments may provide a method for sharing device connections between a host and a client, the method comprising, when the host is not in a power save mode, receiving, by a processor operating a virtual host controller driver of the host, a first device request from a virtual host controller driver of a client, and when the host is in a power save mode, passing, by a native device driver of the client, a second device request to a host controller driver of the client, wherein the host and the client are operably connected and configured to communicate between the host and the client for sharing at least one of one or more connected devices. In some example embodiments, wherein at least one of the devices is initialized by the host, the method may further comprise enumerating, by the host to the virtual host controller driver of the client, the at least one device initialized by the host and available for sharing with the client. In a further example embodiment, the method may further include activating a sharing switch of a host controller to connect a device connection port to the host when the host is not in a power save mode and to connect the device connection port to the client when the host is in a power save mode. In yet a further example embodiment, if the client determines that a device may be used concurrently by the host and client, a method may further include passing a device request of a system call of a native application on the client directly to a system call bridge of the host. As described further herein, some example embodiments may be directed to sharing a USB device connection, and, for example, a device request may be a USB request block, and native device driver may be a USB device driver. Similarly, as described further herein, some example embodiments may include client and hosts that run different operating systems, for example, the host running a Windows operating system and the client running a Linux operating system.

In another example embodiment, an apparatus comprising at least one processor and at least one memory storing computer program code is provided. The at least one memory and stored computer program code are configured, with the at least one processor, to cause the apparatus of this example embodiment to at least, when a host of the apparatus is not in a power save mode, receive, by a processor operating a virtual host controller driver of the host, a first device request from a virtual host controller driver of a client of the apparatus, and when the host is in a power save mode, pass, by a native device driver of the client, a second device request to a host controller driver of the client, wherein the host and the client are operably connected and configured to communicate between the host and the client for sharing at least one of one or more connected devices.

In yet another example embodiment, an apparatus comprising at least one processor and at least one memory storing computer program code is provided. The at least one memory and stored computer program code are configured, with the at least one processor, to cause the apparatus of this example embodiment to at least, when the apparatus is not in a power save mode, receive, by the at least one processor operating a virtual host controller driver of the apparatus, a first device request from a virtual host controller driver of a client device, wherein the apparatus is configured to be operatively connected to a client device and to communicate with the client device for sharing at least one of one or more devices connected to the apparatus, wherein at least one of the devices is initialized by the apparatus, and enumerate to the virtual host controller driver of the client the at least one device initialized by the apparatus and available for sharing with the client.

In yet a further example embodiment, an apparatus comprising at least one processor and at least one memory storing computer program code is provided. The at least one memory and stored computer program code are configured, with the at least one processor, to cause the apparatus of this example embodiment to at least, when a host device is not in a power save mode, transmit, by a processor operating a virtual host controller driver of the apparatus, a first device request to a virtual host controller driver of the host, and when the host is in a power save mode, pass, by a native device driver of the apparatus, a second device request to a host controller driver of the apparatus, wherein the host and the client are operably connected and configured to communicate between the host and the client for sharing at least one of one or more connected devices.

In a further example embodiment, a computer program product is provided. The computer program product of this example embodiment includes at least one non-transitory computer readable medium having computer program code stored thereon. The program instructions of this example embodiment comprise program code, when executed by an apparatus, to cause the apparatus to at least, when a host is not in a power save mode, receive, by a processor operating a virtual host controller driver of the host, a first device request from a virtual host controller driver of a client, and when the host is in a power save mode, passing, by a native device driver of the client, a second device request to a host controller driver of the client, wherein the host and the client are operably connected and configured to communicate between the host and the client for sharing at least one of one or more connected devices.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

Figure 4A:
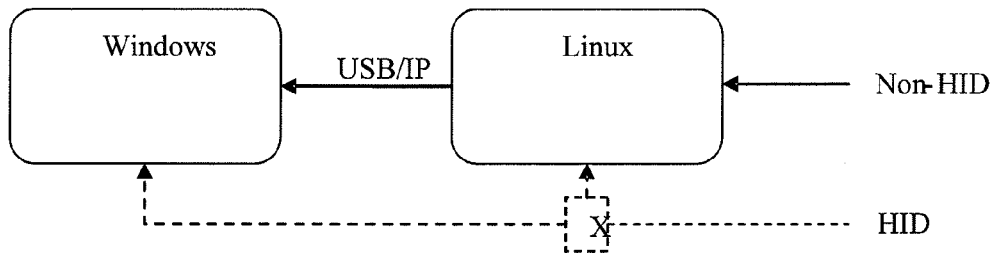
Figure 4B:
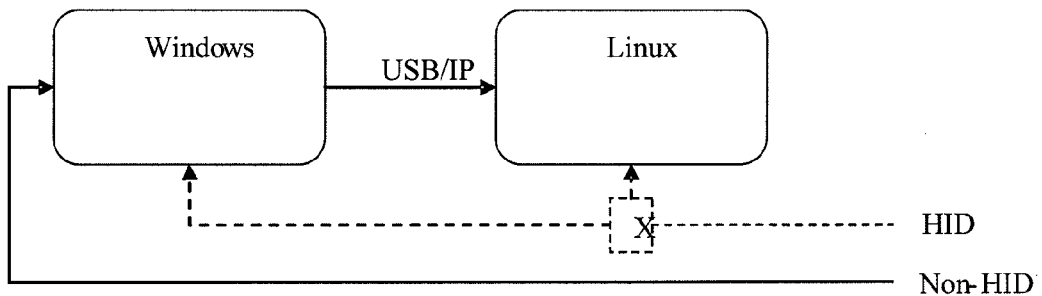
Figure 4C:
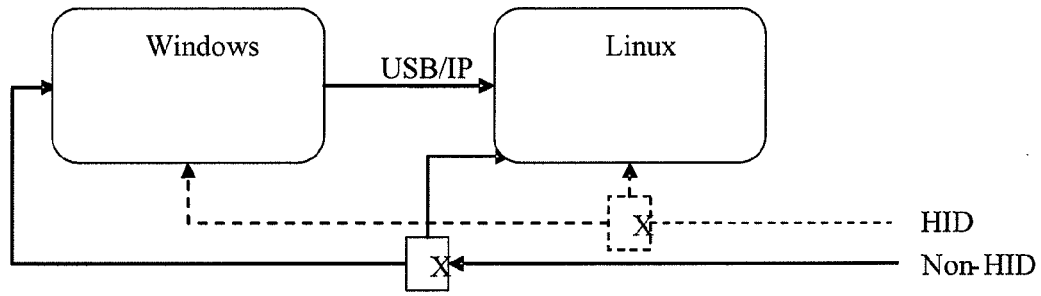
Figure 5:
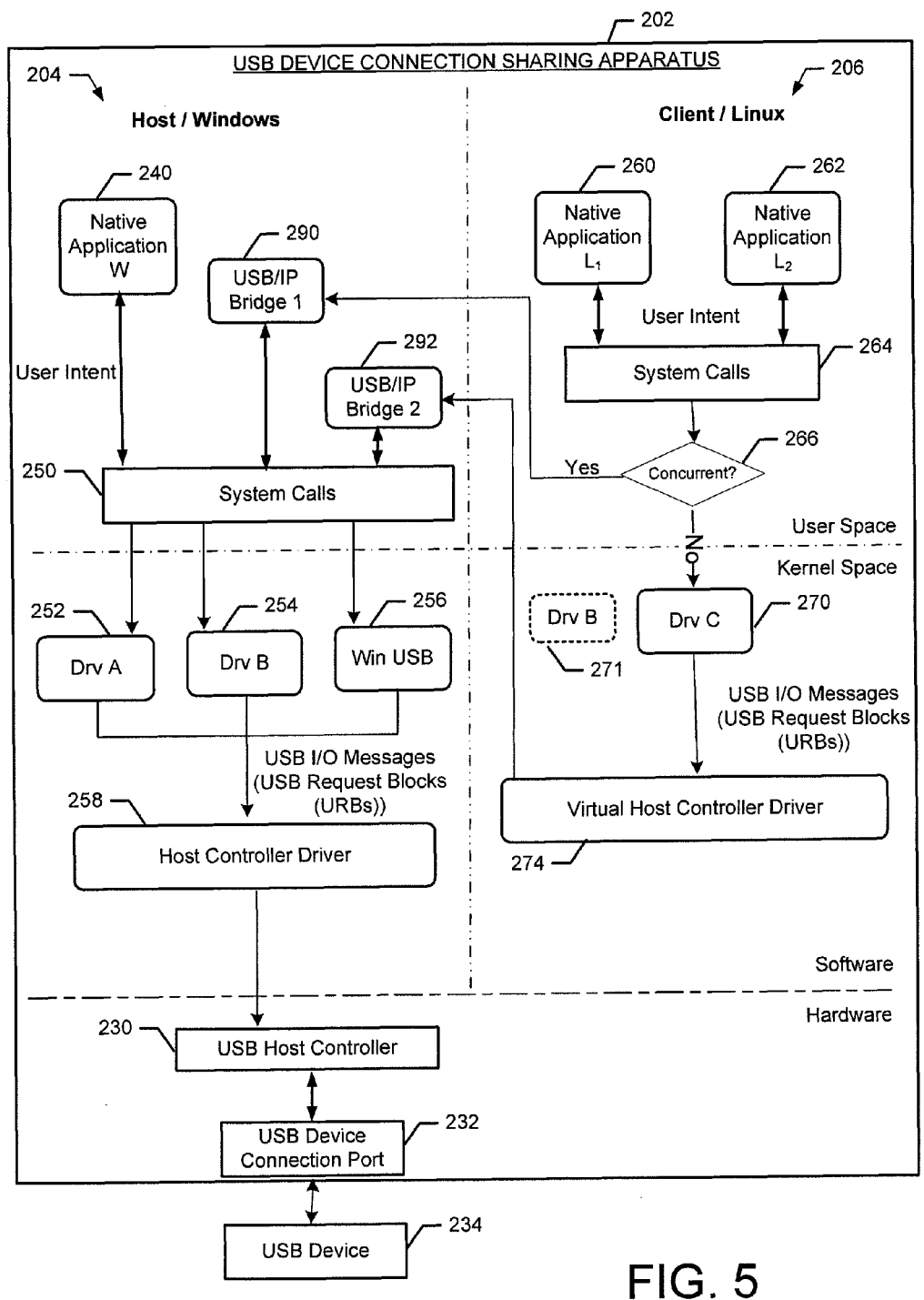
Figure 6:
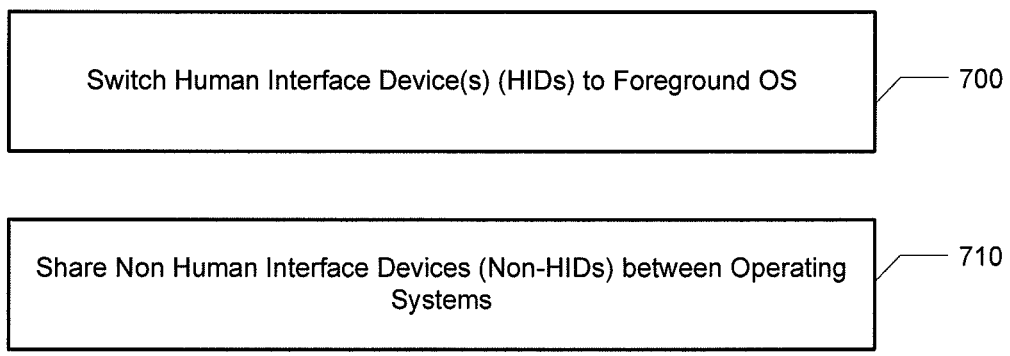
Figure 7:
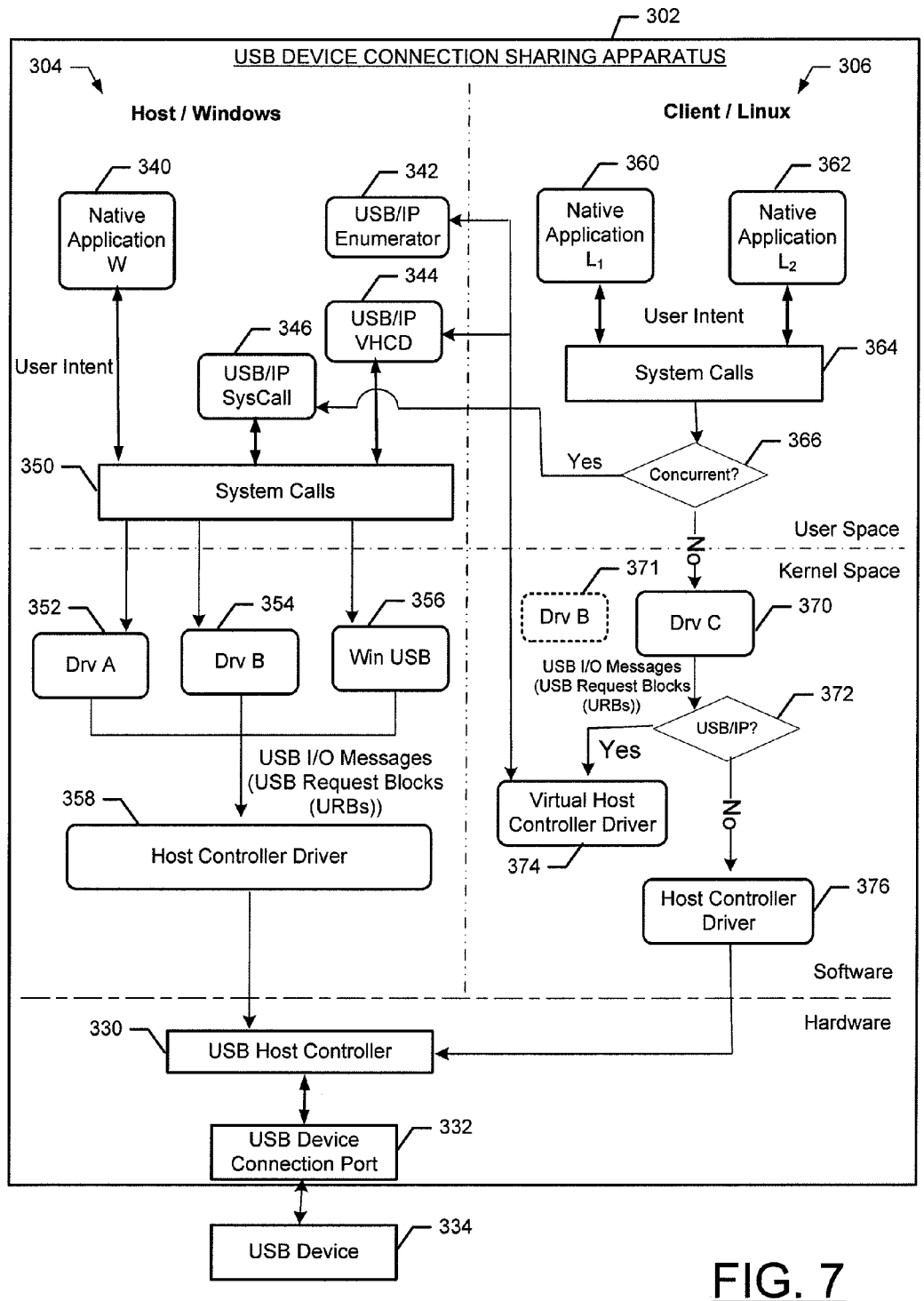
Figure 8A:
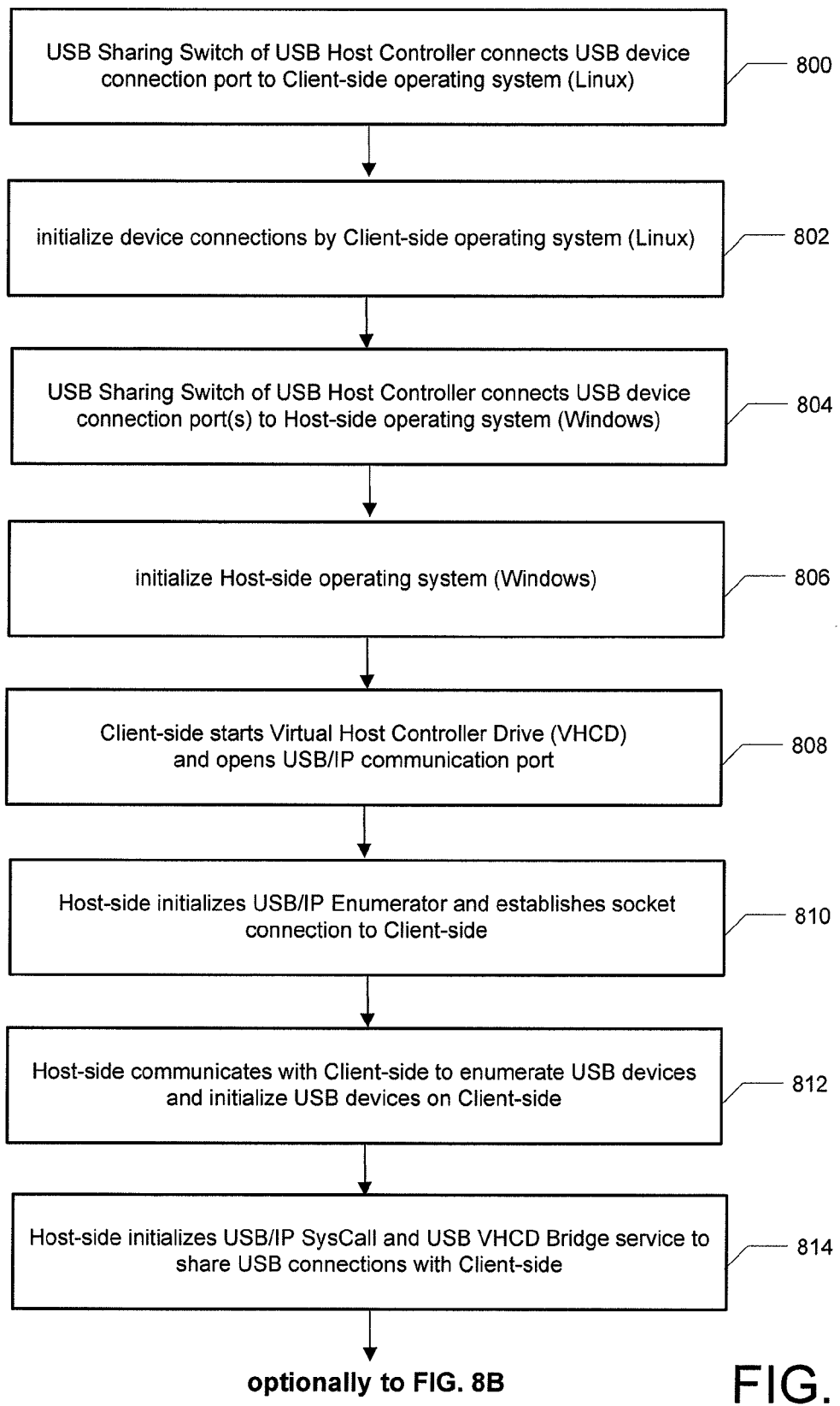
Figure 8B:
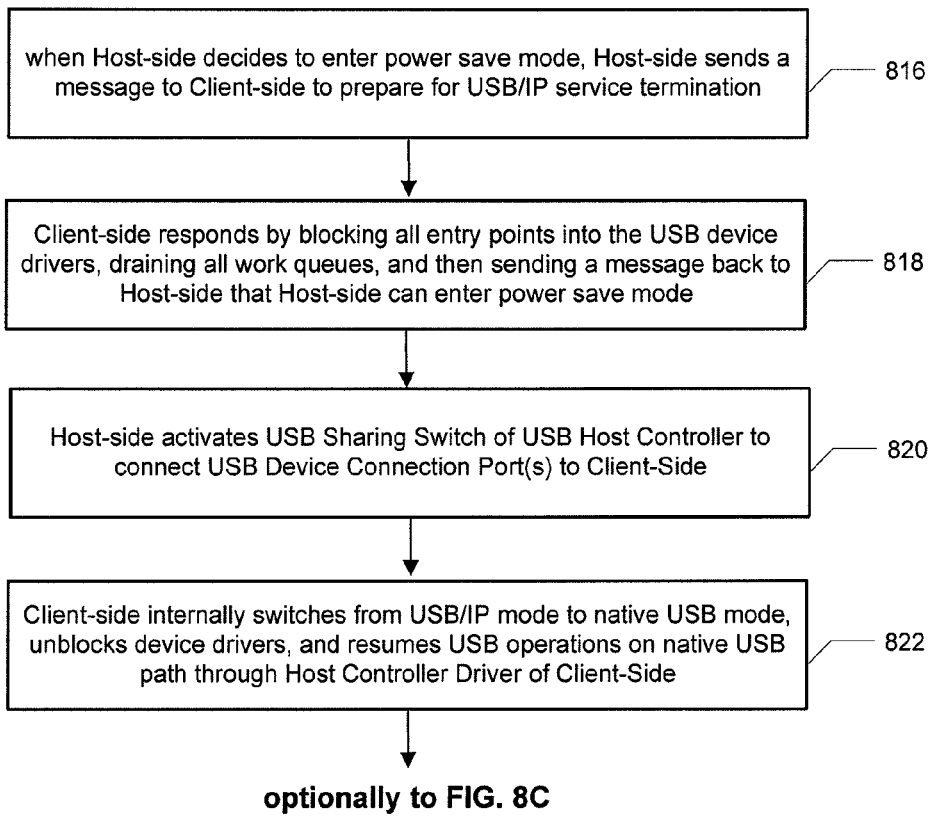
Figure 8C:
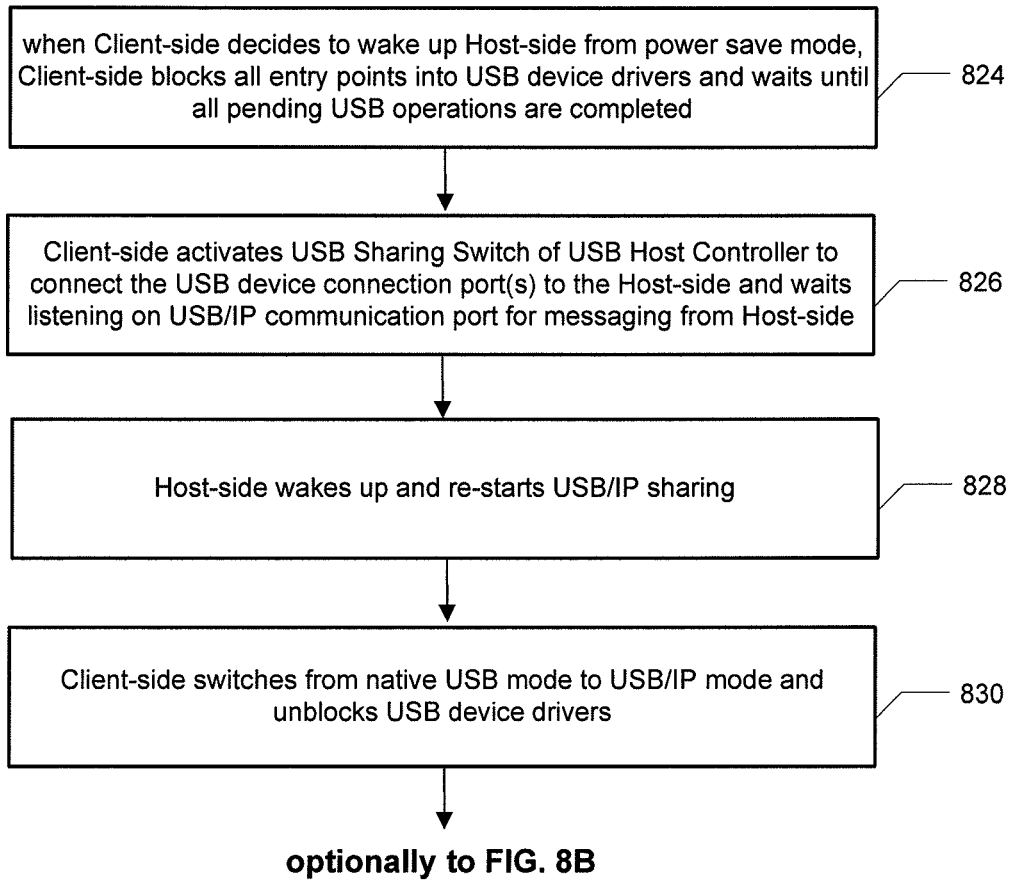

FIGS. 4A, 4B, and 4C illustrate schematic block diagrams of device connection sharing according to some example embodiments;

FIG. 5 is a schematic block diagram of a USB device connection sharing apparatus according to some example embodiments;

FIG. 7 is a schematic block diagram of a USB device connection sharing apparatus according to some example embodiments;

FIG. 6 illustrates example method functions for facilitating sharing device connections according to some example embodiments; and FIGS. 8A, 8B, and 8C illustrate flowchart method functions according to some example embodiments for facilitating sharing device connections.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Examples of non-transitory computer-readable media include a floppy disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
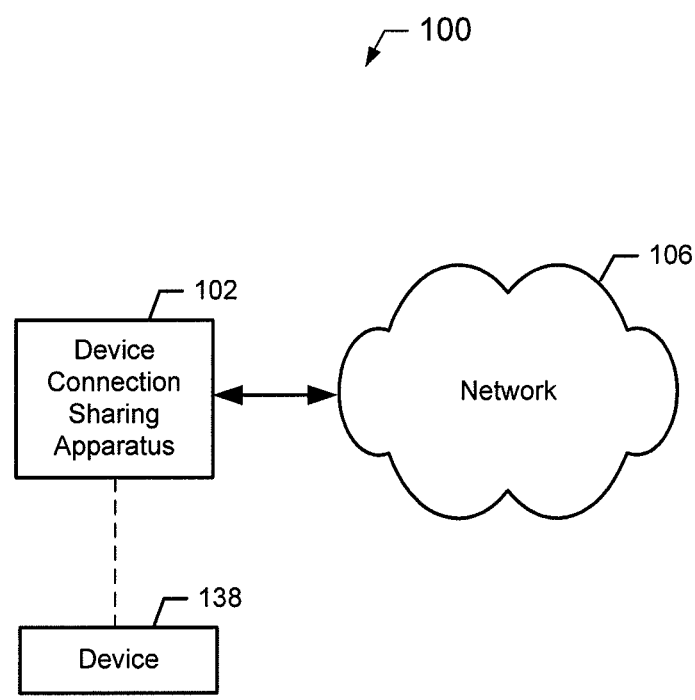
FIG. 1 illustrates a system for facilitating sharing device connections according to some example embodiments.

Referring now to FIG. 1, a block diagram is illustrated of a system 100 for facilitating sharing a device connection according to some example embodiments. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for facilitating sharing a device connection, numerous other configurations may also be used to implement embodiments of the present invention.

In at least some embodiments, the system 100 includes a device connection sharing apparatus 102. The device connection sharing apparatus 102 may be configured to communicate over a network 106. The network 106 may comprise one or more wireless networks (for example, a cellular network, wireless local area network, wireless personal area network, wireless metropolitan area network, and/or the like), one or more wireline networks, or some combination thereof, and in some embodiments may comprises at least a portion of the Internet.

The device connection sharing apparatus 102 may be embodied as any computing device, such as, for example, a desktop computer, laptop computer, mobile terminal, mobile computer, mobile phone, mobile communication device, tablet, game device, digital camera/camcorder, audio/video player, television device, server, radio receiver, digital video recorder, positioning device, wrist watch, portable digital assistant (PDA), a chipset, an apparatus comprising a chipset, any combination thereof, and/or the like. In this regard, the device connection sharing apparatus 102 may be embodied as any computing device configured to share a device connection in accordance with one or more of the example embodiments described further herein below. For purposes of some example embodiments, sharing device connections between computers may be across multiple physical and/or virtual (logical) computers. For example, a single device may share device connections between multiple domains of the single computing device, such as two operating systems. Similarly, for example, a single device may include two independent computers and share device connections across these two independent logical computers. In this respect, computing devices of some embodiments may be a single physical device with one or more virtual computing domains and/or one or more logical computing domains.

The system 100 also includes a device 138. The device 138 may be any internal or external device that operates with the device connection sharing apparatus 102 through a device connectivity port, such as, for example, a Universal Serial Bus (USB) port, Mobile Industry Processor Interface (MIPI®) connection port, an Inter-Integrated Circuit (I²C®) connection port, or a MultiMediaCard (MMC) reader. The device 138 may be, for example, a keyboard, mouse, printer, portable media player, disk drive, flash drive, media/memory card, network adapter, desktop computer, laptop computer, mobile terminal, mobile computer, mobile phone, mobile communication device, tablet, game device, digital camera/camcorder, audio/video player, television device, display, server, router, radio receiver, digital video recorder, positioning device, smart appliance, smart grid appliance or networking device, security system, smart phone, portable digital assistant (PDA), universal power supply (UPS), or other electronic device configured to operate with the device connection sharing apparatus 102.

Figure 2:
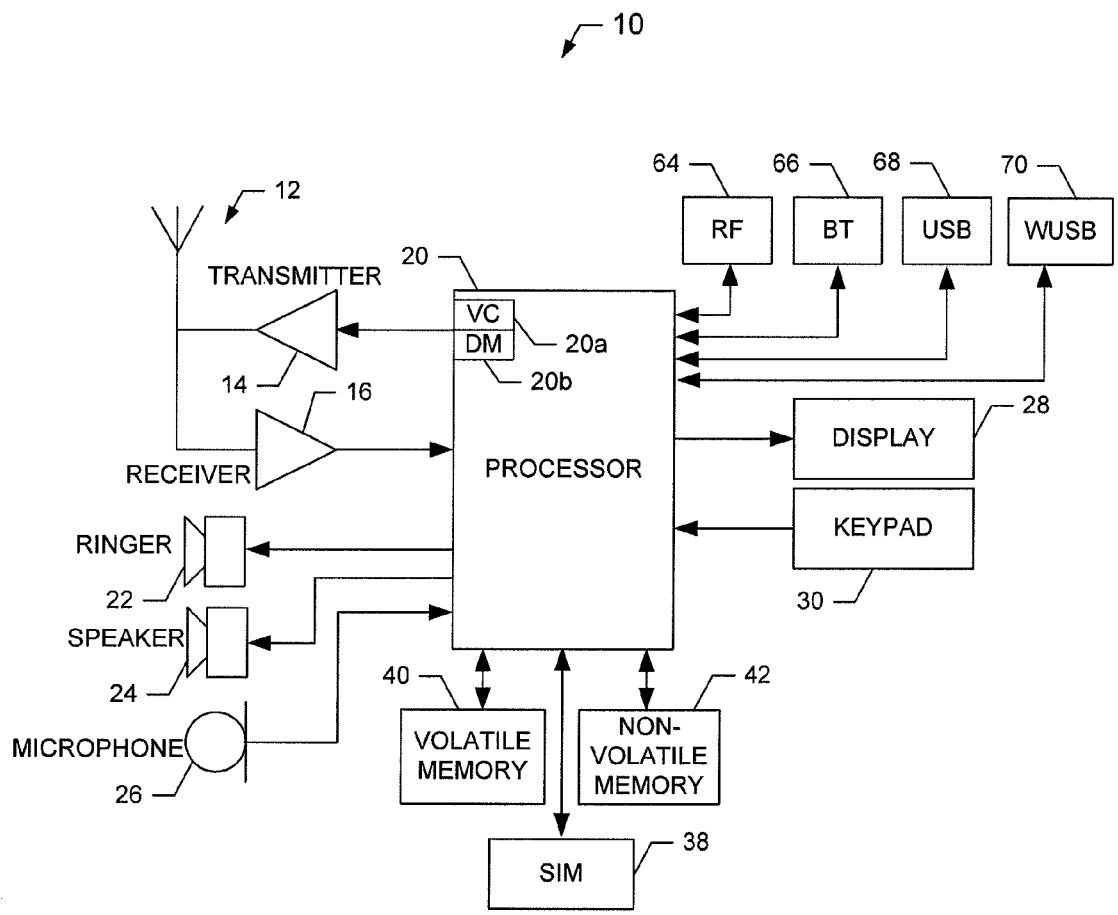
FIG. 2 is a schematic block diagram of a mobile terminal according to some example embodiments.

In some example embodiments, the device connection sharing apparatus 102 may be embodied as a mobile terminal, such as that illustrated in FIG. 2. In this regard, FIG. 2 illustrates a block diagram of a mobile terminal 10 representative of some example embodiments of a device connection sharing apparatus 102. It should be understood, however, that the mobile terminal 10 illustrated and hereinafter described is merely illustrative of one type of device connection sharing apparatus 102 that may implement and/or benefit from various embodiments and, therefore, should not be taken to limit the scope of the disclosure. While several embodiments of the electronic device are illustrated and will be hereinafter described for purposes of example, other types of electronic devices, such as desktop computers, laptop computers, mobile terminals, mobile computers, mobile phones, mobile communication devices, tablets, game devices, servers, routers, smart appliances, smart grid appliances and networking devices, security systems, smart phones, portable digital assistants (PDAs), pagers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), any future communication protocol, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols, such as LTE-Advanced (LTE-A), and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, a Bluetooth® (BT) transceiver 66 operating using Bluetooth® brand wireless technology developed by the Bluetooth® Special Interest Group, a universal serial bus (USB) transceiver 68, a wireless universal serial bus (USB) transceiver 70 and/or the like. The Bluetooth® transceiver 66 may be capable of operating according to ultra-low power Bluetooth® technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
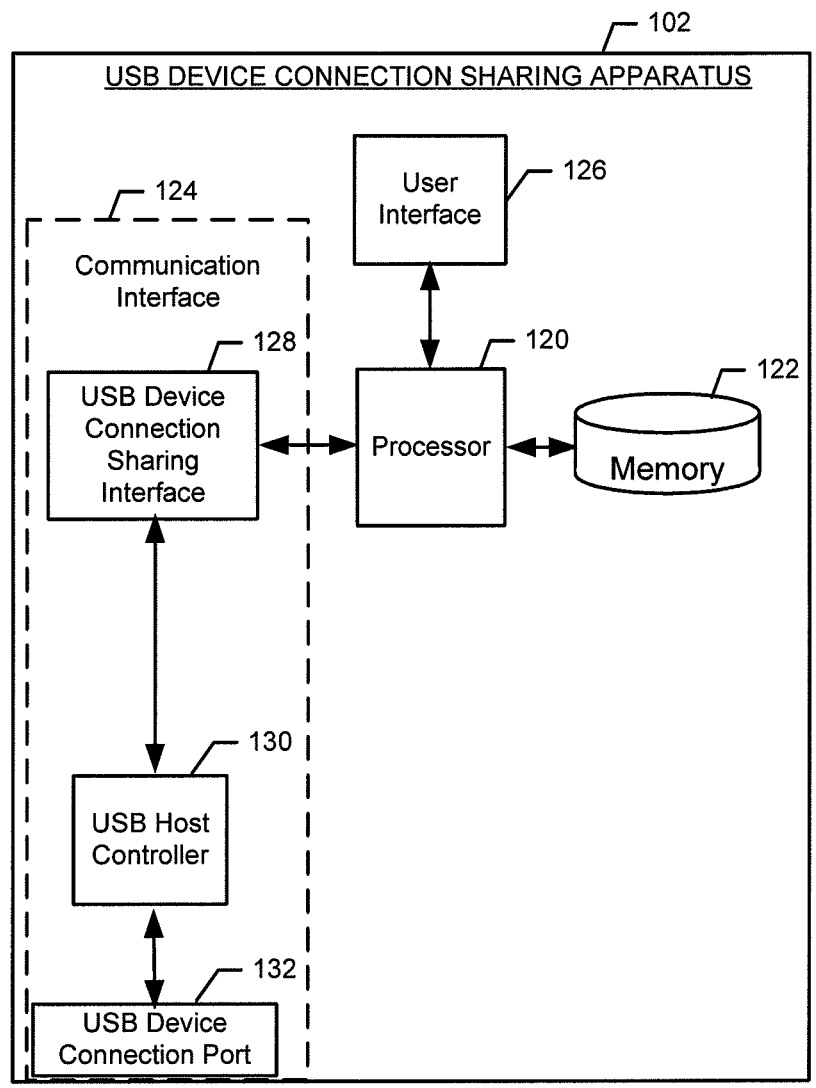
FIG. 3 illustrates a schematic block diagram of a device connection sharing apparatus according to some example embodiments.

Referring now to FIG. 3, a block diagram is illustrated of a device connection sharing apparatus 102 according to some example embodiments. While some example embodiments are illustrated and described with respect to sharing a USB device connection, other embodiments may be similarly configured for sharing other device connections. As described above, internal and external devices may operate with an embodiment of a device connection sharing apparatus 102 through a device connectivity port, such as, for example, a Universal Serial Bus (USB) port (as illustrated in FIG. 3), a Mobile Industry Processor Interface (MIPI®) connection port, an Inter-Integrated Circuit (I²C®) connection port, or a MultiMediaCard (MMC) reader, and may be, for example, a keyboard, mouse, printer, portable media player, disk drive, flash drive, media/memory card, network adapter, desktop computer, laptop computer, mobile terminal, mobile computer, mobile phone, mobile communication device, tablet, game device, digital camera/camcorder, audio/video player, television device, display, server, router, radio receiver, digital video recorder, positioning device, smart appliance, smart grid appliance or networking device, security system, smart phone, portable digital assistant (PDA), universal power supply (UPS), or other electronic device configured to operate with the device connection sharing apparatus 102.

As illustrated in FIG. 3, the device connection sharing apparatus 102 may include various means for performing the various functions herein described, although specifically illustrated and described with respect to sharing a USB device connection. These means may comprise one or more of a processor 120, memory 122, communication interface 124, user interface 126, USB Device Connection Sharing Interface 128, USB Host Controller 130, and USB Device Connection Port 132. The means of the device connection sharing apparatus 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 122) that is executable by a suitably configured processing device (for example, the processor 120), or some combination thereof.

In some example embodiments, one or more of the means illustrated in FIG. 3 may be embodied as a chip or chip set. In other words, the device connection sharing apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, user interface 126, USB Device Connection Sharing Interface 128, USB Host Controller 130, and USB Device Connection Port 132 may be embodied as a chip or chip set. The device connection sharing apparatus 102 may therefore, in some example embodiments, be configured to implement embodiments of the present invention on a single chip or as a single "system on a chip." As another example, in some example embodiments, the device connection sharing apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling sharing device connections with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 120 may comprise a plurality of processors. The plurality of processors may be in operative communication with each other and may be collectively configured to perform one or more functionalities of the device connection sharing apparatus 102 as described herein. The plurality of processors may be embodied on a single computing device or distributed across a plurality of computing devices collectively configured to function as the device connection sharing apparatus 102. For example, in a single device comprising twin independent computers connected by a dedicated network channel and integrated to give the feel of a single computer running multiple operating systems, with one computer running a primary operating system, such as Linux, and the other computer running a secondary operating system, such as Windows, each of the twin independent computers may operate using an independent processor for its operating system, but may share other elements of the device connection sharing apparatus 102 across the two computers and operating system domains, such as, for example, sharing a single USB device connection port 132 for non-human interface devices (non-HIDs) or all USB devices, both HID and non-HID. In embodiments wherein the device connection sharing apparatus 102 is embodied as a mobile terminal 10, the processor 120 may be embodied as or comprise the processor 20. In some example embodiments, the processor 120 may be configured to execute instructions stored in the memory 122 or otherwise accessible to the processor 120. These instructions, when executed by the processor 120, may cause the device connection sharing apparatus 102 to perform one or more of the functionalities of the device connection sharing apparatus 102 as described herein. As such, whether configured by hardware or software methods, or by a combination thereof, the processor 120 may comprise an entity capable of performing operations according to one or more example embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 3 as a single memory, the memory 122 may comprise a plurality of memories. The plurality of memories may be embodied on a single computing device or may be distributed across a plurality of computing devices collectively configured to function as the device connection sharing apparatus 102. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. In some example embodiments wherein the device connection sharing apparatus 102 is embodied as a mobile terminal 10, the memory 122 may comprise the volatile memory 40 and/or the non-volatile memory 42. The memory 122 may be configured to store information, data, applications, instructions, or the like for enabling the device connection sharing apparatus 102 to carry out various functions in accordance with various example embodiments. For example, in some example embodiments, the memory 122 is configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the device connection sharing interface 128 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more local or remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a direct wired connection, wireless network, wireline network, some combination thereof, or the like by which the device connection sharing apparatus 102 and one or more computing devices or computing resources may be in communication. As an example, the communication interface 124 may be configured to enable communication between the device connection sharing apparatus 102 and a USB device over a wired connection or a wireless USB/WiFi connection. The communication interface 124 may additionally be in communication with the memory 122 and user interface 126, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms, some of which may be connected to device connection sharing apparatus 102 through communication interface 124, such as an external add-on keyboard, a mouse, and an external display. In embodiments wherein the user interface 126 comprises a touch screen display, the user interface 126 may additionally be configured to detect and/or receive an indication of a touch gesture or other input to the touch screen display. The user interface 126 may be in communication with the memory 122 and communication interface 124, such as via a bus.

The device connection sharing interface 128 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. As an example, device connection sharing interface 128 may include one or more USB/IP bridges, host controller drivers, virtual host controller drivers, USB/IP virtual host controller drivers, USB/IP enumerators, USB/IP system call bridges, device drivers, Windows USB (Win USB) device drivers, and computer program product comprising computer readable program instructions stored on a computer readable medium, including memory 122, and executed by processor 120 to facilitate sharing device connections, including device connection port 132. In some example embodiments wherein the device connection sharing interface 128 is embodied separately from the processor 120, the device connection sharing interface 128 may be in communication with the processor 120. The device connection sharing interface 128 may further be in communication with one or more of the memory 122 and user interface 126, such as via a bus.

The host controller 130 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. As an example, host controller 130 may include a sharing switch, such as a USB sharing switch, and computer program product comprising computer readable program instructions stored on a computer readable medium and executed by a processing device to facilitate control of the connection of device connection port 132 to multiple domains of device connection sharing apparatus 102. The host controller 130 is in communication with device connection sharing interface 128 of the communication interface 124. In some example embodiments wherein the host controller 130 is embodied separately from the processor 120, the host controller 130 may be in communication with the processor 120. The host controller 130 may further be in communication with one or more of the memory 122 and user interface 126, such as via a bus.

The device connection port 132 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. As an example, device connection port 132 may be a physical USB port comprising circuitry and hardware. As another example, device connection port 132 may be a USB/WiFi port comprising an antenna, a transmitter, a receiver, a transceiver and/or supporting hardware or software for enabling WiFi communications with one or more USB computing devices. The device connection port 132 is in communication with a host controller 130 for operation and communication through device connection sharing interface 128 of communication interface 124. In some example embodiments where the device connection port 132 is embodied separately from the processor 120, the device connection port 132 may be in communication with the processor 120. The device connection port 132 may further be in communication with one or more of the memory 122 and user interface 126, such as via a bus.

Sharing device connections is desirable for numerous reasons and in numerous scenarios. Sharing device connections are relevant for desktop and laptop computing devices, as well as mobile computing devices, such as mobile terminals, mobile computers, mobile phones, mobile communication devices, tablets, and game devices. In particular, sharing USB device connections is becoming more and more important in today's computing world using USB connectivity and USB devices. USB sharing may be accomplished with a USB sharing switch or USB-over-IP (USB/IP). A USB sharing switch allows two or more computers to access the same USB devices, typically by switching a hub of USB devices between the computers. USB/IP is a software method that allows multiple computers to access USB devices concurrently with one computer to which the USB devices are plugged operating as the master and the other computers that use the USB devices through USB/IP as the slaves. For example, FIG. 4A illustrates an example for sharing non-HID USB devices between a Linux master computing device and a Windows slave computing device using USB/IP and sharing HID devices between the Linux master computing device and the Windows slave computing device with a switch or switching operation. With respect to sharing HID devices, the HID devices and device connections are switched to the operating system in the foreground, and the background operating system is disconnected from the HID devices and device connections. Similarly, for example, FIG. 4B illustrates an example for sharing non-HID USB devices between a Windows master computing device and a Linux slave computing device using USB/IP and sharing HID devices between the Windows master computing device and the Linux slave computing device using a switch or switching operation.

USB sharing switches and USB/IP provide considerable functionality for sharing USB device connections, but are also limited in many ways. For example, concurrent/interleaved access to a device becomes difficult using a sharing switch. Similarly, for example, USB/IP is a kernel mode solution, such that any vulnerability in the USB sharing architecture can crash the system. Further, for example, many devices like printers require operations to be atomic; for example, a print request from one application or one machine cannot overlap with a print request from another application or machine. In addition, a USB/IP master must always be operational to ensure USB device sharing for its slaves. As such, USB sharing switches and USB/IP alone or in combination are insufficient for many features, such as providing both concurrent and atomic access to various connected USB devices. Another important feature not well addressed by USB sharing switches and USB/IP is allowing a master computing device to enter a power save mode and relinquish responsibility for USB connectivity to another domain or slave computing device. For example, the device connection sharing of FIGS. 4A and 4B are not optimal because the master computing device must be operating to share the non-HID devices and device connections with the slave computing device. Further, it is desirable to share device connections in a protocol independent manner to allow for sharing device connections in addition to USB device connections, such as Mobile Industry Processor Interface (MIPI®) device connections, Inter-Integrated Circuit (I²C®) device connections, and MultiMediaCard (MMC) device connections. FIG. 4C illustrates a schematic diagram of additional device sharing functionality that may be beneficial, including switching to allow the master domain to enter a power save mode, in which case the device connection switches to the slave domain. Various example embodiments address these and other features for sharing device connections, including sharing USB device connections.

Additional possibilities for sharing device connections between multiple domains are also addresses by some example embodiments. FIG. 5 illustrates a schematic diagram of a device sharing apparatus 202. For example, only the host Windows domain/side 204 of the device connection sharing apparatus 202 includes a driver for device A (Drv A 252). And only the client Linux domain/side 206 of the device connection sharing apparatus 202 includes a driver for device C (Drv C 270). But both the host Windows domain 204 and the client Linux domain 206 of the device connection sharing apparatus 202 include a driver for device B (Drv B 254, 271). This implies that device B could be concurrently used by the host and client. However, device B could require atomic operation, in which case either the host or the client should maintain control of device connection to device B and share the device connection to device B with the other domain.

For clarity of understanding the operations of device connection sharing apparatus 202, also illustrated in FIG. 5 is native application W 240 in the host Windows domain 204 and native applications $L_1$ 260 and $L_2$ 262 in the client Linux domain 206. Each of these native applications are configured to make systems calls for user intent within their respective domain, i.e., system calls 250 in the host Windows domain 204 from native application W 240 and system calls 264 in the client Linux domain 206 from native applications $L_1$ 260 and $L_2$ 262. The system calls 250 for native application W 240 are directed to device drivers Drv A 252 and Drv B 254, which are then passed as device requests/messages, such as USB Request Blocks (URBs) for USB drivers and devices, to host controller driver 258 in the host Windows domain 204. The host controller driver 258 passes the device requests/messages to the host controller 230 which connects to the device 234 through the device connection port 232.

The client Linux domain 206 is connected to the device 234 and device connection port 232 through the host Windows domain 204. Specifically, if a device and device connection are permitted to operate concurrently as determined at decision block 266, system calls 264 may be passed directly from the client Linux domain 206 to a USB/IP bridge$_1$ 290 operating in the host Windows domain 204. However, if a device and device connection are not permitted to operate concurrently, such as requiring atomic access or for a device and connection with unknown requirements, or if a device driver (for example, Drv C 270) resides in the client Linux domain 206, the system calls 264 may be pass to a native driver (for example, Drv C 270 or Drv B 271), which then passes the device requests/messages, such as USB Request Blocks (URBs) for USB drivers and devices, to virtual host controller driver 274 in the client Linux domain 206, which then passes the device requests/messages to USB/IP bridge$_2$ 292 in the host Windows domain 204. As necessary, the USB/IP bridge$_1$ 290 and USB/IP bridge$_2$ 292 may translate the device requests/messages to an appropriate system call in the host Windows domain, which may then be passed to the Win USB driver 256.

Device connection sharing may also support both distributed and concurrent device ownership. In a distributed mode, though a device may be physically shared between two domains, only one domain actually uses the device. In contrast, in a concurrent mode of device ownership, both of domains will have drivers loaded for the device, and will access it concurrently.

Device connection sharing may also support atomic and interleaved device operations. Certain devices like printers will need operations to complete atomically before another application, domain, or operating system can make another operation request. For example, print requests should not be inter-mixed from two different applications, domains, or operating systems.

Device connection sharing may also be beneficial to minimize the number of device connection ports required for a computing device, such as to only require a single USB connection port for a single device comprising twin independent computers connected by a dedicated network channel and integrated to give the feel of a single computer running multiple operating systems, with one computer running a primary operating system, such as Linux, and the other computer running a secondary operating system, such as Windows.

In some example embodiments, two independent operating domains are each able to act as a host simultaneously for a device connection. For example, connected Windows and Linux operating systems running on independent computers integrated in a single device may each be the USB host for a USB device connection.

In some example embodiments, two independent operating domains are collectively able to share a device connection. Either of the independent operating domains may act as a host in a host mode to share the device connection with the other independent operating domain acting as a client in a client mode. For example, connected Windows and Linux operating systems running on independent computers integrated in a single device may be able to efficiently share a USB device connection.

In some example embodiments, switching of device connections is accomplished using software techniques, such as using software USB bridging and software control of device connections with a host controller (for example, USB host controller 330). Unlike physical switching which typically request switching a whole hub of device connections, software switching allows sharing and switching of devices and device connections on a per-device and per-connection basis. And each device and connection can be shared with different characteristics, such as allowing concurrent/interleaved access by multiple applications and domains or restricting a device and connection to atomic access by a single domain, application, and operating system until a routine is completed.

As illustrated in FIGS. 4A, 4B, and 4C, HID and non-HID devices and device connections may be operated and shared differently. For example, separate device connection ports may be available for HID device and non-HID devices, where the HID device connection port is always switched to the control of a domain operating in the foreground, such as for keyboard and mouse control, and where the non-HID device connection port is shared through one domain to another domain, such as for a printer, scanner, or external storage drive. For example, if a Linux domain of a two computer device is operating in the foreground, the HID devices and device connections are switched to the Linux domain as the foreground operating system, and if the Windows domain of a two computer device is operating in the foreground, the HID devices and device connections are switched to the Windows domain as the foreground operating system, and the Linux domain is disconnected from the HID devices and device connections.

FIG. 6 illustrates example method functions for facilitating sharing device connections according to some example embodiments. Specifically, block 700 illustrates how some example embodiments may switch human interface devices (HIDs) to the foreground operating system. Block 710 illustrates how some example embodiments may share non-human interface devices (non-HIDs) between multiple domains or operating systems.

In some example embodiments, no distinction need be made between HID and non-HID devices and device connections, all device connections may be shared through one domain to another domain, and, for example, a device connection port may be available for both HID and non-HID devices that is shared through one domain to another domain.

FIG. 7 illustrates an example embodiment device connection sharing apparatus 302 in which device 334 is shared through device connection port 332 and host controller 330 with both a host Windows domain 304 and a client Linux domain 306. The identity of the host domain running Windows and the client domain running Linux in FIG. 7 is only exemplary of some example embodiments. Multiple domains may be running the same or different operating systems, and various combinations of operating systems may be host-client pairings. Like the example embodiment device connection apparatus 202 of FIG. 5, the device connection apparatus 302 of FIG. 7 includes a native application W 340 in the host Windows domain/side 304 and native applications $L_1$ 360 and $L_2$ 362 in the client Linux domain/side 306. Each of these native applications are configured to make systems calls for user intent within their respective domain, i.e., system calls 350 in the host Windows domain 304 from native application W 340 and system calls 364 in the client Linux domain 306 from native applications $L_1$ 360 and $L_2$ 362. The system calls 350 for native application W 340 are directed to device drivers Drv A 352 and Drv B 354, which are then passed as device requests/messages, such as USB Request Blocks (URBs) for USB drivers and devices, to host controller driver 358 in the host Windows domain 304. The host controller driver 358 passes the device requests/messages to the host controller 330 which connects to the device 334 through the device connection port 332. The client Linux domain 306 also includes native device drivers Drv C 370 and Drv B 371.

The client Linux domain 306 of device sharing apparatus 302 may be connected to the device 334 and device connection port 232 both through the host controller driver 358 of the host Windows domain 304 from the virtual host controller driver 374 and through host controller driver 376. That is, the client Linux domain 306 operates both the virtual host controller driver 374 and the host controller driver 376 for device connectivity depending upon, for example, the power mode status of the host Windows domain 304 and the availability of USB/IP device connection sharing. Specifically, if the host Windows domain 304 is active and not in a power save mode and has initialized USB/IP device connection sharing, the client Linux domain 306 connects to device connection port 332 through the host Windows domain 304 using virtual host controller driver 374. However, if the host Windows domain 304 is not active and in a power save mode, the client Linux domain 306 connects to device connection port 332 from host controller driver 376 in the client Linux domain 306 to the host controller 330 at the hardware level of the device connection sharing apparatus 302. Decision block 372 determines whether the client Linux domain 306 of device connection sharing apparatus 302 uses its virtual host controller driver 374 and the host Windows domain 304 or its native host controller driver 376 for device connection.

Similarly, decision block 366 is a determination if a device and device connection are permitted to operate concurrently, in which case system calls 364 may be passed directly from the client Linux domain 306 to a USB/IP system call bridge 346 operating in the host Windows domain 304 in translating these system calls from the client Linux domain 306 to the appropriate Windows system calls. However, if a device and device connection are not permitted to operate concurrently or if a device driver (for example, Drv C 370) resides in the client Linux domain 306, and the client Linux domain 306 is not connected to the device connection port 332 through its native host controller driver 376, then system calls 364 may be pass to a native driver (for example, Drv C 370 or Drv B 371), which then passes the device requests/messages, such as USB Request Blocks (URBs) for USB drivers and devices, to virtual host controller driver 374 in the client Linux domain 306, which then passes the device requests/messages to USB/IP VHCD 344 in the host Windows domain 304.

To facilitate the device sharing described above with respect to the device connection sharing apparatus 302 of FIG. 7, a USB/IP enumerator 342 is employed on the host Windows domain 304. The USB/IP enumerator 342 is a service which enumerates the device tree for the virtual host controller driver 374 of the client Linux domain 306. The USB/IP enumerator 342 may also be responsible for messaging the client Linux domain 306 when a new device is detected by the host Windows domain 302, when a device raises an interrupt, and similar informational messaging to the client Linux domain 306 regarding the device connection port 332 and devices 334 when the host controller 330 is connected to the host Windows domain 304.

The virtual host controller driver 374 on the client Linux domain 306 controls the USB/IP bridging with the host Windows domain 304. For example, the virtual host controller driver 374 opens a communication port on the client Linux domain 306 to channel USB communication back and forth between the host Windows domain 304 and the client Linux domain 306.

The USB/IP system call (SysCall) bridge 346 is a service which receives messages from the client Linux domain 306 system call interface 364. The USB/IP system call bridge 346 translates the received system calls from the client Linux domain 306 into the appropriate host Windows domain 304 system calls and performs USB operations on behalf of the client Linux domain 306.

The USB/IP virtual host controller driver (VHCD) bridge 344 is a WinUSB service which receives the USB input/output (I/O) messages generated by native drivers (for example, Drv C 370) on the client Linux domain 306, translates the received system calls from native drivers of the client Linux domain 306 into the appropriate system calls for WinUSB, and performs USB operations on behalf of the client Linux domain 306.

FIGS. 8A, 8B, and 8C illustrate flowchart method functions according to some example embodiments for facilitating sharing device connections. In this regard, FIGS. 8A, 8B, and 8C illustrate operations that may be performed by the device connection sharing apparatus 302. The operations illustrated in and described with respect to FIGS. 8A, 8B, and 8C illustrate may, for example, be performed by, with the assistance of, and/or under the control of one or more of the processor 120, memory 122, communication interface 124, user interface 126, device connection sharing interface 128, or host controller 130.

With respect to FIG. 8A, operation 800 may comprise a device sharing switch of host controller 330 connecting device connection port 332 with the client Linux domain 306. This connection will cause the host controller driver 376 native on the client Linux domain 306 to perform enumeration and hardware initializations of the devices 334 connected to the device connection port 332, including loading native device drivers (for example, Drv C 370 and Drv B 371), as illustrated at operation 802. Once the device connections have been initialized by the client Linux domain 306, the client Linux domain 306 may instruct the device sharing switch of the host controller 330 to connect with the host Windows domain 304, thereby relinquishing the direct device connections between the client Linux domain 306 and the device connection port 332, as illustrated at operation 804. Once connected to the device connection port 332, the host Windows domain 304 will perform a similar device connection initialization of the devices 334 connected to the device connection port 332, as illustrated at operation 806. The processor 120, memory 122, communication interface 124, device connection sharing interface 128, and/or host controller 130 may, for example, provide means for performing operations 800, 802, 804, and 806.

The client Linux domain 306 will start a virtual host controller driver (VHCD) 374, which opens up a communication port for USB/IP and listens to the communication port for events from the host Windows domain 304, as illustrated by operation 808. The host Windows domain 304 will start a corresponding USB/IP enumerator service 342 to establish a socket connection to the client Linux domain 306, as illustrated at operation 810. The host Windows domain 304 may then communicate with client Linux domain 306 to enumerate devices 334 and initialize devices 334 on the client Linux domain 306, as illustrated at operation 812. For example, host Windows domain 304 may send a message over the socket to the client Linux domain 306 indicating that a USB hub has been detected, enumerate the connected USB devices 334, and work with the client Linux domain 306 to initialize the connected USB devices 334 on the client Linux domain 306, such as to load appropriate USB device drivers. Further, for example, the host Windows domain 304 may also indicate to the client Linux domain 306 for which devices 334 the host Windows domain 304 has loaded device drivers, so that client Linux domain 306 can treat the corresponding devices 334 as concurrent/atomic devices, and then the client Linux domain 306 can disambiguate on its own about the nature of atomicity of the device operations, for example, from the USB device classes, etc. Although some messaging of operation 812 may be redundant, some embodiments will keep the USB/IP protocol generic to be portable to other computer device architectures. The host Windows domain 304 may then start up the USB/IP system call bridge 346 and the USB/IP virtual host control driver (VHCD) bridge 334 to share the USB device connection port 332 and device 334 with the client Linux domain 306, as illustrated at operation 814. At this point, the host Windows domain 304 and the client Linux domain 306 can share the USB device connections. The processor 120, memory 122, communication interface 124, device connection sharing interface 128, and/or host controller 130 may, for example, provide means for performing operations 808, 810, 812, and 814.

FIG. 8B illustrates flowchart method functions according to some example embodiments for facilitating sharing device connections when a host decides to enter a power save mode. As illustrated by operation 816, the host Windows domain 304 sends a message to client Linux domain 306 to prepare for USB/IP service termination. As illustrated by operation 818, the client Linux domain 306 responds by blocking all entry points into the USB device drivers, draining all work queues, and then sending a message back to the host Windows domain 304 that the host Windows domain 304 can enter a power save mode. The host Windows domain 304 will activate the USB sharing switch of the host controller 330 to connect the device connection port 332 and connected devices 334 with the client Linux domain 306, as illustrated at operation 820. The client Linux domain 306 internally switches from USB/IP mode to native USB mode, unblocks device drivers, and resumes the USB operations on a native USB path through host controller driver 376 of the client Linux domain 306, as illustrated by operation 822. The processor 120, memory 122, communication interface 124, device connection sharing interface 128, and/or host controller 130 may, for example, provide means for performing operations 816, 818, 820, and 822.

FIG. 8C illustrates a flowchart method functions according to some example embodiments for facilitating sharing device connections when a client decides to wake a host from a power save mode. As illustrated by operation 824, when the client Linux domain 306 decides to wake up the host Windows domain 304 from a power save mode, the client Linux domain 306 blocks all entry points into USB device drivers and waits until all pending USB operations are completed. The client Linux domain 306 then activates the USB sharing switch of the USB host controller 330 to connect the USB device connection ports 332 to the host Windows domain 304 and waits listening on its USB/IP communication port of the virtual host controller driver 374 for messaging from the host Windows domain 304, as illustrated at operation 826. When the host Windows domain 304 wakes up from the power save mode, it can then re-start USB/IP sharing of device connections with the client Linux domain 306, as illustrated by operation 828. Because USB/IP sharing between the host Windows domain 304 and the client Linux domain 306 have previously been initialized, many of the initialization steps will not be necessary when the host Windows domain 304 wakes up from a power save mode. And when the host Windows domain 304 messages that it is ready to resume the USB/IP operations, the client Linux domain 306 internally switches from native USB mode to USB/IP mode and unblocks the USB device drivers for operation with the shared device connections through the host Windows domain 304, as illustrated by operation 830. The processor 120, memory 122, communication interface 124, device connection sharing interface 128, and/or host controller 130 may, for example, provide means for performing operations 824, 826, 828, and 830.

In some example embodiments, there may be more than two domains sharing device connections. For example, if a primary host shares device connections with a primary client and a secondary client, if the primary host enters a power save mode, the primary client may become the host for the secondary client. This sort of cascading waterfall control of device connections may be implemented in some example embodiments. In other example embodiments, a hierarchy for passing the control of device connections may be established, for example, based upon such factors as device drivers resident in a domain for connected devices, performance of device drivers by the domains, network connectivity, and user preference. In operation of some examples, only one device acts as the host for one or more clients. When the host goes into a power save mode, any one of the clients is identified to become the successor host, the device connections are switched over to the successor host, and host software services on the successor host are initiated for the remaining clients. At the same time, it should be appreciated that a device may be a host for at least one device while being a client of at least one other device. For example, a single device comprising twin independent computers connected by a dedicated network channel and integrated to give the feel of a single computer running multiple operating systems, with one computer running a primary operating system, such as Linux, and the other computer running a secondary operating system, such as Windows, may itself be a client through a USB connection to a desktop computer while also operating as a host for another device, such as a mobile gaming device through a USB WiFi connection.

FIGS. 6, 8A, 8B, and 8C each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 122) and executed by a processor in the computing device (for example, by the processor 120). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, a device connection sharing apparatus 102, 202, 302) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, a device connection sharing apparatus 102, 202, 302) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 120) may provide all or a portion of the elements. In another embodiment, all or a portion of the elements may be configured by and operate under control of a computer program product. The computer program product for performing the methods of an example embodiment includes a computer-readable storage medium (for example, the memory 122), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   when a host is not in a power save mode, receiving, by a processor operating a virtual host controller driver of the host, a first device request from a virtual host controller driver of a client, wherein the host provides connectivity between the client and at least one device of one or more connected devices via the host;

prior to the host entering a power save mode, causing transmission of a first message, from the host to the client, notifying the client to prepare for disablement of the connectivity;

when the host is in the power save mode, passing, by a native device driver of the client, a second device request to a host controller driver of the client, wherein the connectivity between the client and the at least one device via the host is disabled, and the client is natively connected to the at least one of one or more connected devices;

in response to the first message notifying the client to prepare for disablement of the connectivity, causing the client to block entry to device drivers and to drain work queues; and causing transmission of a second message, from the client to the host, confirming the client is prepared for the disablement, wherein the host and the client are operably connected and configured to communicate between the host and the client for sharing the at least one device.

2. The method of claim 1, wherein at least one of the devices is initialized by the host, and wherein the method further comprises enumerating, by the host to the virtual host controller driver of the client, the at least one device initialized by the host and available for sharing with the client.

3. The method of claim 1, further comprising activating a sharing switch of a host controller to connect a device connection port to the host when the host is not in a power save mode and to connect the device connection port to the client when the host is in a power save mode.

4. The method of claim 1, further comprising initializing, by the client, at least one of the connected devices.

5. The method of claim 1, further comprising, if the client determines that a device may be used concurrently by the host and client, passing a device request of a system call of a native application on the client directly to a system call bridge of the host.

6. The method of claim 5, further comprising translating, by the system call bridge, the device request from the host into a corresponding request of a system call of the host.

7. The method of claim 1, wherein the first device request is a first USB request block, wherein the second device request is a second USB request block, and wherein the native device driver of the client is a USB device driver.

8. The method of claim 1, wherein the client and the host run different operating systems.

9. An apparatus comprising at least one processor and at least one memory storing computer program code, wherein the at least one memory and stored computer program code are configured, with the at least one processor, to cause the apparatus to at least:

when a host of the apparatus is not in a power save mode, receive, by a processor operating a virtual host controller driver of the host, a first device request from a virtual host controller driver of a client of the apparatus, wherein the host provides connectivity between the client and at least one device of one or more connected devices via the host;

prior to the host entering a power save mode, cause transmission of a first message, from the host to the client, notifying the client to prepare for disablement of the connectivity;

when the host is in the power save mode, pass, by a native device driver of the client, a second device request to a host controller driver of the client, wherein the connectivity between the client and the at least one device via the host is disabled, and the client is natively connected to the at least one of one or more connected devices;

in response to the first message notifying the client to prepare for disablement of the connectivity, causing the client to block entry to device drivers and to drain work queues; and causing transmission of a second message, from the client to the host, confirming the client is prepared for the disablement, wherein the host and the client are operably connected and configured to communicate between the host and the client for sharing the at least one device.

10. The apparatus of claim 9, wherein at least one of the devices is initialized by the host, and wherein the at least one memory and stored computer program code are configured, with the at least one processor, to further cause the apparatus to enumerate, by the host to the virtual host controller driver of the client, the at least one device initialized by the host and available for sharing with the client.

11. The apparatus of claim 9, wherein the at least one memory and stored computer program code are configured, with the at least one processor, to further cause the apparatus to activate a sharing switch of a host controller to connect a device connection port to the host when the host is not in a power save mode and to connect the device connection port to the client when the host is in a power save mode.

12. The apparatus of claim 9, wherein the at least one memory and stored computer program code are configured, with the at least one processor, to further cause the apparatus to initialize, by the client, at least one of the connected devices.

13. The apparatus of claim 9, wherein, if the client determines that a device may be used concurrently by the host and client, the at least one memory and stored computer program code are configured, with the at least one processor, to further cause the apparatus to pass a device request of a system call of a native application on the client directly to a system call bridge of the host.

14. The apparatus of claim 13, wherein the at least one memory and stored computer program code are configured, with the at least one processor, to further cause the apparatus to translate, by the system call bridge, the device request from the host into a corresponding request of a system call of the host.

15. The apparatus of claim 9, wherein the first device request is a first USB request block, wherein the second device request is a second USB request block, and wherein the native device driver of the client is a USB device driver.

16. The apparatus of claim 9, wherein the at least one memory and stored computer program code are configured, with the at least one processor, to further cause the apparatus to run different operating systems on the host and the client.

17. The apparatus of claim 9, wherein the apparatus comprises or as embodied on a mobile phone, the mobile phone comprising user interface circuitry and user interface software stored on one or more of the at least one memory; wherein the user interface circuitry and user interface software are configured to:

facilitate user control of at least some functions of the mobile phone through use of a display; and cause at least a portion of a user interface of the mobile phone to be displayed on the display to facilitate user control of at least some functions of the mobile phone.

18. An apparatus comprising at least one processor and at least one memory storing computer program code, wherein the at least one memory and stored computer program code are configured, with the at least one processor, to cause the apparatus to at least:
   when a host device is not in a power save mode, transmit, by a processor operating a virtual host controller driver of the apparatus, a first device request to a virtual host controller driver of the host, wherein the host provides connectivity between the apparatus and at least one device of one or more connected devices via the host;
   prior to the host entering a power save mode, cause transmission of a first message, from the host to the apparatus, notifying the apparatus to prepare for disablement of the connectivity;
   when the host is in a power save mode, pass, by a native device driver of the apparatus, a second device request to a host controller driver of the apparatus, wherein the connectivity between the apparatus and the at least one device via the host is disabled, and the apparatus is natively connected to the at least one of one or more connected devices,
   in response to the first message notifying the client to prepare for disablement of the connectivity, causing the client to block entry to device drivers and to drain work queues; and
   causing transmission of a second message, from the client to the host, confirming the client is prepared for the disablement,
   wherein the host and the apparatus are operably connected and configured to communicate between the host and the apparatus for sharing the at least one device.

19. A computer program product comprising at least one non-transitory computer readable medium having program code stored thereon, wherein the program code, when executed by an apparatus, causes the apparatus at least to:
   when a host is not in a power save mode, receive, by a processor operating a virtual host controller driver of the host, a first device request from a virtual host controller driver of a client, wherein the host provides connectivity between the client and at least one device of one or more connected devices via the host; and
   prior to the host entering a power save mode, cause transmission of a first message, from the host to the client, notifying the client to prepare for disablement of the connectivity;
   when the host is in a power save mode, pass, by a native device driver of the client, a second device request to a host controller driver of the client, wherein the connectivity between the client and the at least one device via the host is disabled, and the client is natively connected to the at least one of one or more connected devices,
   in response to the first message notifying the client to prepare for disablement of the connectivity, causing the client to block entry to device drivers and to drain work queues; and
   causing transmission of a second message, from the client to the host, confirming the client is prepared for the disablement,
   wherein the host and the client are operably connected and configured to communicate between the host and the client for sharing the at least one device.

* * * * *

UNITED STATES PATENT AND TRADEMARK OFFICE
CERTIFICATE OF CORRECTION

PATENT NO. : 9,081,703 B2  
APPLICATION NO. : 13/233537  
DATED : July 14, 2015  
INVENTOR(S) : Nair et al.

Page 1 of 1

It is certified that error appears in the above-identified patent and that said Letters Patent is hereby corrected as shown below:

In the claims:

Column 22,
Lines 8 and 11, "causing", both occurrences, should read --cause--.

Column 23,
Lines 24 and 27, "causing", both occurrences, should read --cause--.

Column 24,
Lines 22 and 25, "causing", both occurrences, should read --cause--.

Signed and Sealed this
Twenty-first Day of June, 2016

Michelle K. Lee
*Director of the United States Patent and Trademark Office*